March 2, 1965
C. H. MINER
3,171,299
POWER TRANSMISSION DEVICE
Filed Aug. 31, 1962
3 Sheets-Sheet 1
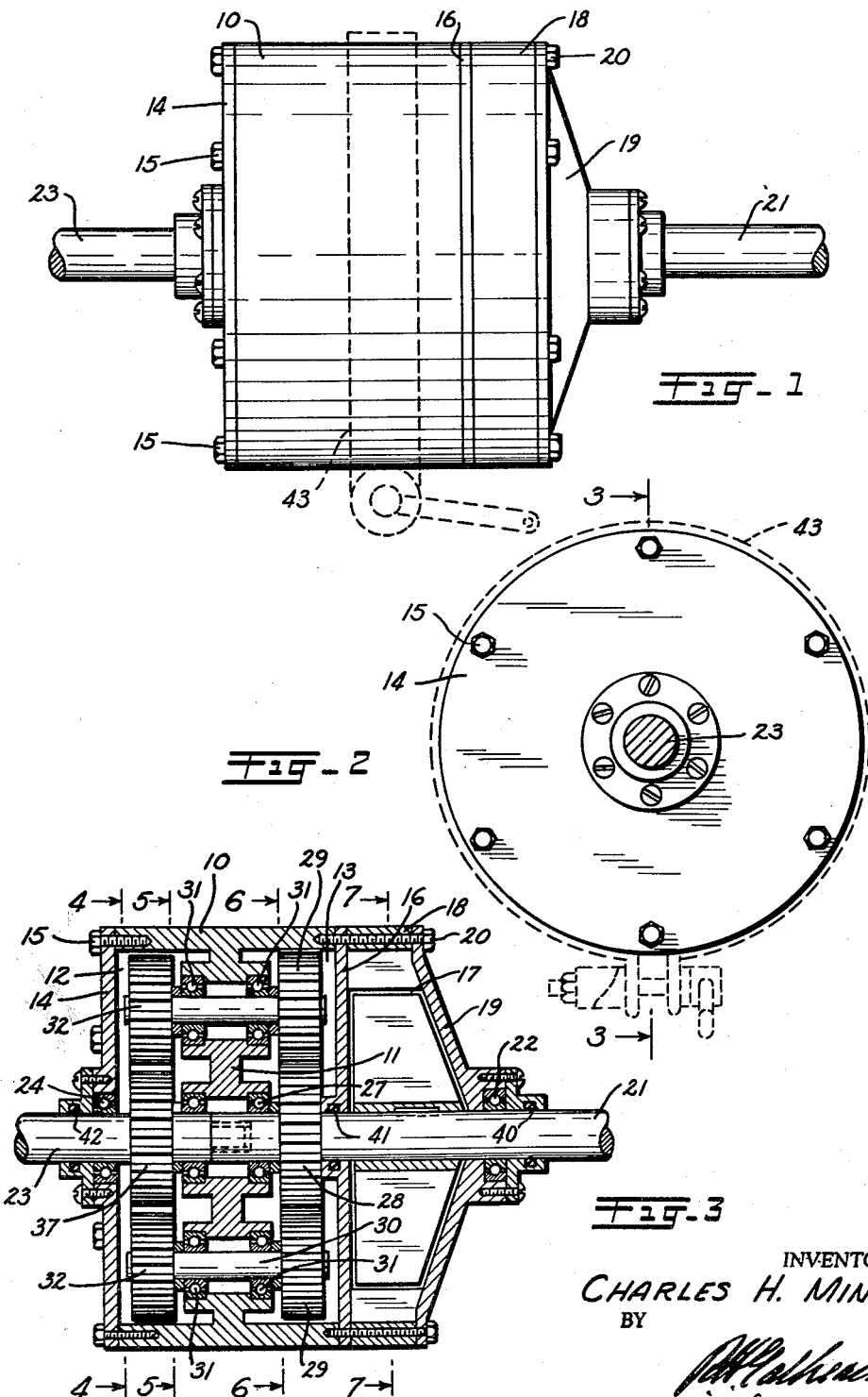
INVENTOR.
CHARLES H. MINER
BY
ATTORNEY March 2, 1965  C. H. MINER  3,171,299
POWER TRANSMISSION DEVICE
Filed Aug. 31, 1962  3 Sheets-Sheet 2
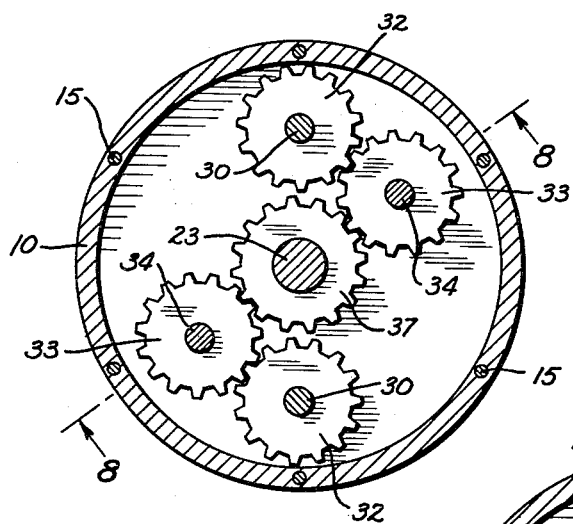
Fig-4
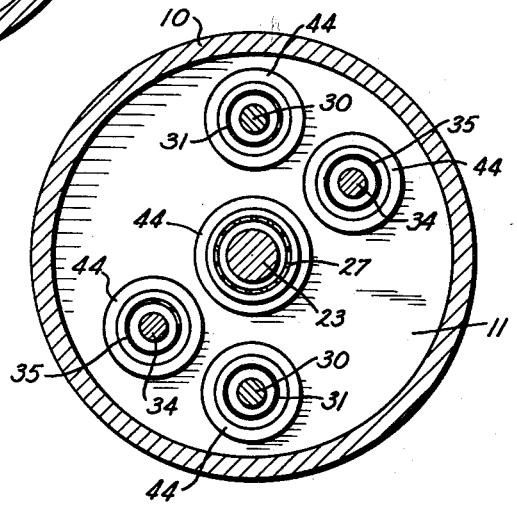
Fig-5
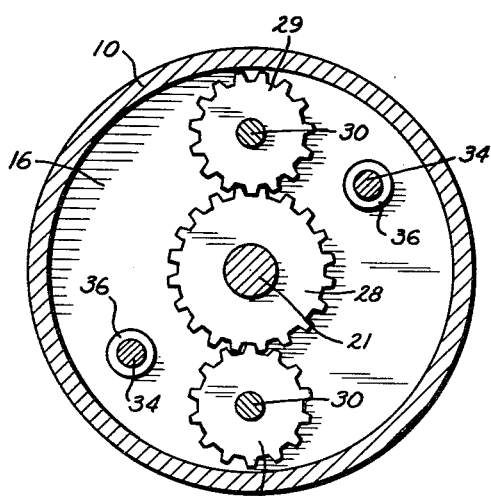
Fig-6
INVENTOR.
CHARLES H. MINER
BY
ATTORNEY

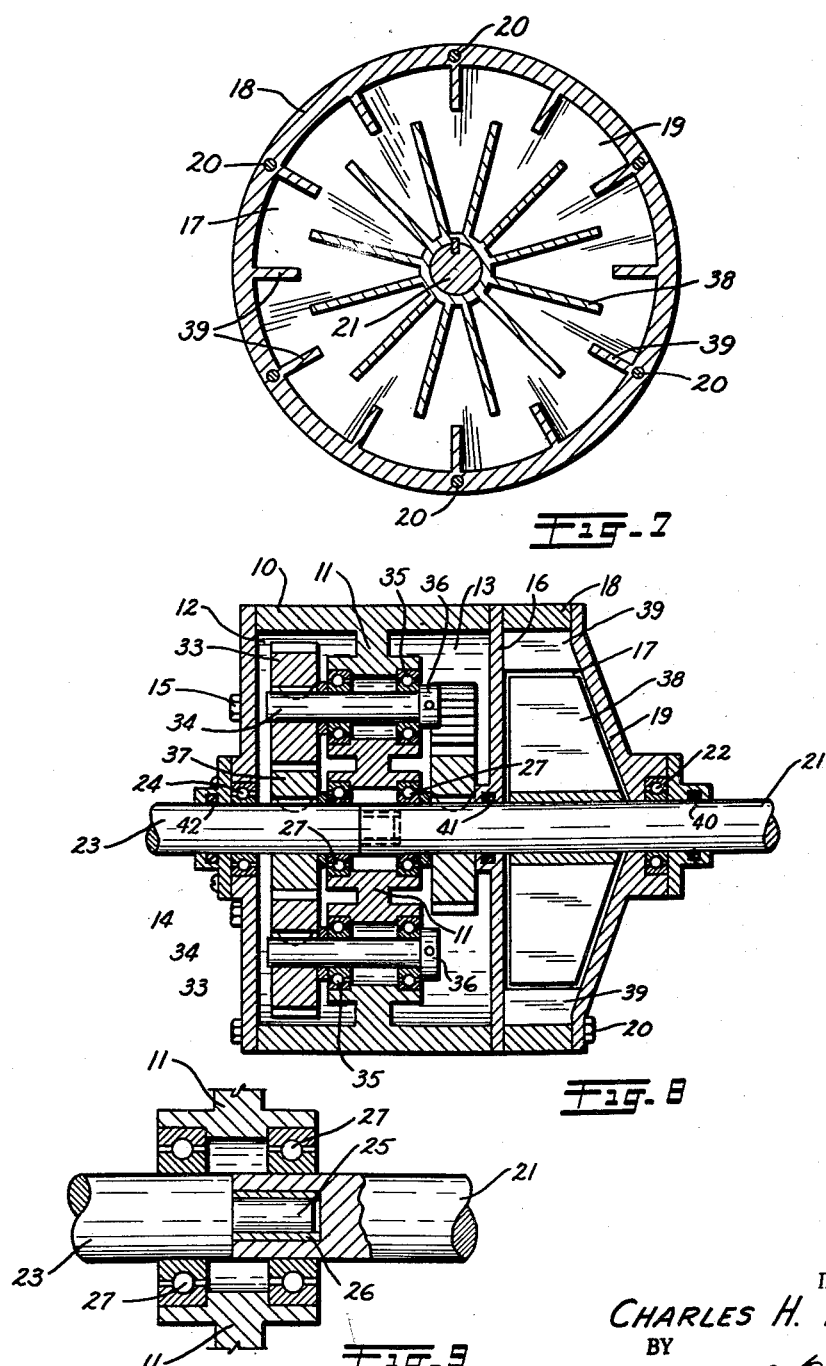

3,171,299
POWER TRANSMISSION DEVICE
Charles H. Miner, 581 S. Downing St., Denver 9, Colo.
Filed Aug. 31, 1962, Ser. No. 220,736
5 Claims. (Cl. 74—688)

This invention relates to an automatic fluid power transmission and, while more particularly designed for use on automotive vehicles, will be found useful wherever it is desired to control the transmission of power between aligned drive and driven shafts.

The principal object of the invention is to provide a fluid power transmission for use between a drive shaft, driven by an engine, and a driven shaft, carrying the load to which power is to be transmitted, which will initially apply torque at an infinite ratio to slowly start the driven shaft regardless of the load and which will automatically and smoothly decrease the ratio as the load is accelerated until a unitary, 1 to 1, or direct drive is attained.

Another object is to provide a transmission of the above type which wil absorb but a minimum of power when the engine is idling with the driven shaft stationary and in which, when in the direct drive position, all gears will be stationary relative to each other to eliminate all gear friction losses.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a side elevational view of the improved automatic transmission;

FIG. 2 is a front end elevational view thereof;

FIG. 3 is a longitudinal section therethrough taken on the line 3—3, FIG. 2;

FIGS. 4, 5, 6 and 7 are cross sectional views taken on the lines 4—4, 5—5, 6—6, and 7—7, respectively, FIG. 3;

FIG. 8 is an axial section taken on the line 8—8, FIG. 4; and

FIG. 9 is an enlarged detail view, partially broken away showing the manner in which the drive and driven shafts are maintained in axial alignment for relative rotation.

The improved automatic fluid transmission employs a cylindrical gear housing 10 having a medial dividing web 11 positioned in a plane at right angles to the axis so as to divide the housing into a front gear compartment 13 and a rear gear compartment 12. The rear gear compartment 12 is closed by a face plate 14 secured thereon by means of suitable cap screws 15. The front gear compartment 13 is closed by a circular partition plate 16 which separates the latter compartment from a fluid drive compartment 17. The fluid drive compartment is surrounded by a circumferential fluid housing 18 and closed by a conical head 19. Elongated clamp screws 20 clamp the head 19, the fluid housing 18 and the partition plate 16 together and against the gear housing 10 to form a completely sealed enclosure.

A drive shaft 21, from an engine or other source of power, is axially journalled in anti-friction bearings 22 in the head 19 and extends through the fluid drive compartment 17 and through the partition plate 16 terminating in the web 11. A driven shaft 23 is journalled in anti-friction bearings 24 in the face plate 14 and extends through the rear gear compartment 12 terminating in the web 11 in axial alignment with the drive shaft 21. The axial alignment is maintained by forming a concentric reduced extremity 25 on one of the shafts and inserting it in a concentric internal bearing 26 in the other shaft with both shafts mounted in suitable ball bearings 27 in the housing web 11.

A drive gear 28 is keyed on the drive shaft 21 within the front gear compartment 13 in constant mesh with two oppositely positioned forward planet pinions 29. The planet pinions 29 are mounted on the forward extremities of the two planet shafts 30 mounted in ball bearings 31 in the web 11 and extending completely through the latter. A rear planet pinion 32 is mounted on each planet shaft 30 in the rear gear compartment 12. Each rear planet pinion gear 32 is in constant mesh with an idler pinion 33. The idler pinions are mounted on the rear extremities of idler shafts 34 also journalled in suitable ball bearings 35 in the web 11 and are maintained against axial movement by suitable terminal collars 36. The idler pinions 33 are in constant mesh with a driven gear 37 keyed on the driven shaft 23 within the rear gear compartment 12. The web 11 is preferably formed with oppositely projecting bearing sleeves 44 for receiving the races of the ball bearings 27, 31 and 35.

The fluid housing 18 encloses a fluid torque converter consisting of a vaned rotor or impellor 38 keyed on the drive shaft 21 and acting to pump or impel transmission fluid against inwardly extending runner or turbine blades 39 formed on the inner circumference of the fluid housing 18. The vanes of the impellor 38 have a greater width adjacent the axis than at the periphery of the rotor so as to increase the velocity of the fluid being thrown centrifugally outward.

The transmission fluid is sealed in the torque converter by an external sealing or O-ring 40 at the bearing 22 and an internal O-ring 41 in the partition plate 16. The housing 10 contains lubricating oil which is sealed therein by the internal O-ring 41 and an external O-ring 42 at the bearing 24.

For the purpose of description, it will be assumed that the drive shaft 21 is an extension of the crank shaft of an automobile engine and the driven shaft 23 is connected through the conventional propellor shaft to the rear wheels of the automobile. It will also be assumed that the relative gear ratios are such that if the driven gear 37 is held stationary and the drive gear 28 is rotated, the housing 10, which in the instant structure is the planet carrier, will rotate once to each two revolutions of the drive gear 28. Other ratios can be built into the transmission by installing gears and pinions of selected ratios.

Now let us assume that the engine is idling, that the drive gear is being driven slowly forward, and that the driven shaft is being held stationary by the load or by the vehicle brakes. The fluid torque converter 38-39 will rotate the housing 10 forwardly at one-half the speed of the drive shaft with the rear planet pinions acting as traction pinions traveling forwardly about the stationary driven gear 37.

Now let us assume the brakes are released and the speed of the drive shaft is increased. This will cause the housing to accelerate beyond one-half the speed of the input shaft so as to increase the tractive effort between the idler pinions 33 and the driven gear 37 to drive the latter forwardly at an infinitely low initial ratio. As the load is taken up, the speed of the housing will increase until a balance is reached between the input power and the load. Now if the speed of the engine is increased, the speed of the housing will increase until the housing is rotating at unity with the input shaft at which time all gears and pinions are stationary relative to each other and all revolve as a unit about the axis of the shafts 21 and 23 without individual rotation in themselves. This is the direct, 1-1, drive state.

Should the load on the driven shaft increase, for instance if the vehicle encounters a grade, the speed of the housing will drop below 1-1 so as to apply just sufficient gear effort to carry the added load without additional power input, or the speed of the engine can if possible be increased to bring the housing back to 1-1 or crank shaft speed.

It can be seen that the transmission at all times smoothly and automatically adjusts itself through infinite variations to provide a balance between the power input and the load from an infinitely low ratio to direct drive.

The invention is also adaptable, if desired, for reverse operation by simply providing means for retarding rotation of the housing 10 such as by means of a brake band, the position of which is indicated in broken line at 43. The friction of the band will reduce the speed of the housing to less than one-half the speed of the input shaft. The reduction in speed of the housing will be transmitted by the idler pinions 33 to the output gear in reverse direction.

While a fluid torque converter has been illustrated and described for transmitting forward rotation from the drive shaft 21 to the housing 10, it is conceivable that other means could be used for the purpose such as a variable speed belt drive between the input shaft and the housing.

In any case, when the housing is rotating forwardly at one-half crank shaft speed, the driven gear may be held stationary with a minimum absorption of power. When the housing is rotated forwardly at less than crank shaft speed, the driven gear will be driven in reverse direction. When the housing is rotated forwardly at more than one-half crank shaft speed, power will be applied to initiate rotation of the driven gear. The gear ratio between the drive shaft and the driven shaft will gradually decrease as the load is picked up until the direct drive position is reached.

This invention absorbs less power in the idling position than the conventional fluid drive due to the fact that the turbine blades 39 are moving forwardly with, although at less speed than, the impellor blades, whereas, When the conventional fluid drive is in the idling position, the impellor blades are working against the reaction of stationary turbine blades.

While the invention has been illustrated and described with two sets of planet gears and planet gear shafts, it could be made with three or four sets of planet gears and planet gear shafts to obtain greater torsional strength without increase in diametric size.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A power transmission device for transmitting power from a drive shaft to a driven shaft abutting and in axial alignment with said drive shaft comprising: a cylindrical gear housing; a medial dividing web integral with and in a plane at right angles to the axis of said housing and dividing the latter into a front gear compartment and a rear gear compartment; bearing means on said web rotatably and axially supporting the abutting extremities of said shafts in said web so that said drive and driven shafts will extend axially from said front and rear gear compartments, respectively; a drive gear fixedly mounted on said drive shaft in said front gear compartment; a driven gear fixedly mounted on said driven shaft in said rear gear compartment; a planet shaft journalled in said web eccentrically of said drive and driven shafts; a forward planet pinion affixed on said planet shaft in said front gear compartment in constant mesh with said drive gear; a rear planet pinion affixed on said planet shaft in said rear gear compartment; an idler pinion journalled on said web in said rear gear compartment in constant mesh with both said rear planet pinion and said driven gear; and variable means for transmitting forward rotation from said drive shaft to said housing to gradually bring the latter to drive shaft speed as a balance between the load and the power input is approached.

2. A power transmission device as described in claim 1 in which the variable means for transmitting forward rotation from said drive shaft to said housing comprises a fluid torque converter interposed between said input shaft and said housing to drive the latter forwardly and cause the planet shaft to orbit about said driven gear when the torque transmitted by said converter exceeds the resistance on said housing.

3. A power transmission device as described in claim 2 having a second planet shaft journalled in said web diametrically opposite said first planet shaft; a second forward planet pinion affixed on said second planet shaft in mesh with said drive gear; a second rear planet pinion affixed to said second planet shaft; and a second idler pinion journalled on said web in constant mesh with both said second rear planet pinion and said driven gear.

4. A power transmission device as described in claim 3 in which the torque converter comprises a partition plate secured to said housing and closing the front of said front gear compartment; an annular fluid housing mounted on said gear housing forwardly of said partition plate; turbine blades formed on and extending radially inward from said housing; a conical head mounted on and closing the front of said fluid housing to form a fluid compartment; and a vaned rotor mounted on said drive shaft within said fluid compartment.

5. A power transmission device comprising: a drive shaft; a drive gear fixedly mounted on said drive shaft; a driven shaft axially aligned with and substantially abutting said drive shaft; a driven gear fixedly mounted on said driven shaft; a bearing web rotatably mounted about said shafts substantially at their point of abuttment and supporting the said shafts for rotation; a plurality of planet shafts journalled in said web; a plurality of idler shafts journalled in said web, said planet shafts and said idler shafts being parallel to and eccentrically of said drive and driven shafts; a forward planet pinion fixedly mounted on the forward extremity of each planet shaft in constant mesh with said drive gear; an idler gear fixedly mounted on the rear extremity of each idler shaft in constant mesh with said driven gear; a rear planet pinion fixedly mounted on the rear extremity of each planet shaft in constant mesh with one of said idle pinions; and means for transmitting an accelerating forward rotation to said web from said drive shaft to tend to cause said web to rotate in unison with said drive shaft.

References Cited by the Examiner

UNITED STATES PATENTS

| 1,473,487 | 11/23 | McCarthy | 74—688 |
| 2,129,884 | 9/38 | Swan | 74—688 |
| 2,543,878 | 3/51 | Stewart | 74—688 |
| 2,635,486 | 4/53 | Lindsay | 74—688 |
| 2,658,594 | 11/53 | Brown. | |

DON A. WAITE, *Primary Examiner.*